United States Patent [19]

Ramus

[11] Patent Number: 4,668,270

[45] Date of Patent: May 26, 1987

[54] METHOD OF MAKING AN ELECTRICALLY HEATED, GLASS VISION UNIT

[75] Inventor: Kevin J. Ramus, Dearborn, Mich.

[73] Assignee: Ford Motor Company, Dearborn, Mich.

[21] Appl. No.: 906,003

[22] Filed: Sep. 11, 1986

[51] Int. Cl.⁴ .......................... C03B 23/02; H05B 3/26
[52] U.S. Cl. ......................................... 65/106; 65/104; 65/107; 65/59.3; 219/203; 219/543
[58] Field of Search ................ 65/59.3, 104, 106, 107; 219/203, 543

[56] References Cited

U.S. PATENT DOCUMENTS

| | | | |
|---|---|---|---|
| 2,569,773 | 10/1951 | Orr | 219/543 |
| 2,724,658 | 11/1955 | Lytle | 219/543 |
| 4,119,425 | 10/1978 | Marriott | 65/107 |
| 4,543,466 | 9/1985 | Ramus | 219/541 X |

*Primary Examiner*—Arthur Kellogg
*Attorney, Agent, or Firm*—William E. Johnson; Clifford L. Sadler

[57] ABSTRACT

This specification teaches a method of making an electrically heated, glass vision unit having a complex curved configuration. The method is initiated by cutting a glass substrate (10) from a flat glass bracket (12). The glass substrate (10) has first and second surfaces separated by a uniform distance. A pair of electrically conductive bus bars (16—16) are applied to one of the surfaces of the glass substrate (10). The bus bars (16—16) are so positioned on the flat glass substrate (10) that when the substrate (10) is bent to form the glass vision unit of complex curved configuration, the pair of electrically conductive bus bars (16—16) are equally distant from one another throughout their entire extent. The flat glass substrate (10) is bent to form the glass vision unit of complex curved configuration. A conductive coating (20) is applied to the one surface of the glass substrate (10) and extends between the pair of bus bars (16—16) throughout their entire extent. In this manner, when electrical energy is applied to the bus bars (16—16), a uniform flow of current takes place from one bus bar to another bus bar so that a uniformly developed heating pattern is established between the bus bars (16—16). The steps of bending the flat glass substrate and applying the conductive coating may be interchanged.

4 Claims, 6 Drawing Figures

METHOD OF MAKING AN ELECTRICALLY HEATED, GLASS VISION UNIT

TECHNICAL FIELD

This application is directed to a method of making an electrically heated, glass vision unit. In particular, the method disclosed in this specification is one of making an electrically heated, glass vision unit having a complex curved configuration. The vision unit finds principle use as the windshield vision unit of a vehicle such as a motor vehicle. The vision unit is one which may be defogged and/or deiced by application of an electrical current to an electrically conductive coating on or in the windshield. Generally, the electrically conductive coating, which covers most of the windshield surface, is transparent to radiation in the visible wave length range.

BACKGROUND AND PRIOR ART STATEMENT

Motor vehicles, as presently manufactured, are equipped with systems for defogging and deicing windshields. Generally, the systems depend upon heat generated in the internal combustion engine and transferred to the engine's cooling system to be blown as warm air across the interior of the windshield to accomplish the defogging and deicing. In such a case, of course, it is readily apparent that there is a period of time between the starting of an engine and the time that sufficient heat is being generated in its cooling system in order to provide a defogging and/or deicing of the vehicle's windshield. Depending upon the exact temperature conditions and the time the vehicle has been sitting idle without its engine running, the period of time before sufficient heat is available to accomplish this function can be up to ten minutes or more.

In view of the fact that there can be a rather lengthy delay before the present day motor vehicle's heating and defrosting system can clear a windshield, automotive designers have been attempting to design systems which generate heat from electrical energy to accomplish a relatively rapid defrost and deicing of a vehicle windshield. Such an electrically heated defrosting and deicing system generally would be independent of the normal heating and defrosting system contained in the motor vehicle.

Many different systems have been purposed for accomplishing this rapid defrost and deicing function, including the placement of an electrically conductive transparent coating on the windshield and embedding fine wires in a laminating inter layer of the windshield.

Another feature that is desirable in such an electrically heated windshield is a uniform defogging and deicing of the windshield without any hot spots. By this, I mean that a gradual and uniform defogging or deicing takes place on the windshield.

No search was conducted on the subject matter of this specification in the United States Patent Office or in any other search facility. I am, however, aware of my previously issued U.S. Pat. No. 4,543,466 for a Bus Bar Arrangement for Uniformly Heating a Trapezoidally-Shaped Electrically Heated Windshield. This patent issued on Sept. 24, 1985 and is also assigned to Ford Motor Company who is the assignee of this application.

My aforementioned patent discloses an electrically heated windshield of generally trapezoidal shape. This windshield has bus bars of uniform conductivity throughout their length and extending in line contact with the upper and lower edges of a continuous uniformly thick trapezoidally-shaped electrically conductive coating provided on the windshield surface for deicing and defrosting the windshield. The line of contact of the upper bus bar with the conductive coating has a length generally equal to the entire effective length of the upper edge of the conductive coating. The lower bus bar is symmetrically located along the lower edge of the conductive coating and has a line of contact length equal to the sum of the length of the upper bus bar plus generally about one-half the difference between the entire effective length of the lower edge of the conductive coating minus the length of the line of contact of the upper bus bar.

In my aforementioned patent, I noted that I had personally conducted a search in the U.S. Patent Office with respect to the subject of that patent. I reported as a result of my search that the U.S. Pat. Nos. 957,728; 3,313,920; 3,947,618 and 4,361,751 were of interest with respect to the subject matter of my previous application. However, these four patents are not of interest with respeot to the subject matter of this application and therefore no further discussion thereof will be undertaken. The reader is referred to my aforementioned patent for a brief summary of each of these four patents.

DISCLOSURE OF INVENTION

This invention is directed to a method of making an electrically heated, glass vision unit and, in particular, to a method of making an electrically heated, glass vision unit, having a complex curved configuration.

In accordance with the teachings of the method of my invention, an electrically heated, glass vision unit having a complex curved configuration is made in the following manner. A glass substrate is cut from a flat glass bracket. The glass substrate has first and second surfaces separated by a generally uniform distance.

A pair of electrically conductive bus bar are applied to one of the surfaces of the glass substrate. The bus bars are so positioned on the flat glass substrate that when the substrate is bent to form the glass vision unit of complex curved configuration, the pair of electrically conductive bus bars are equally distant from one another throughout their entire extent.

The flat glass substrate is bent to form the glass vision unit of complex curved configuration. Once bent, the pair of bus bars on the glass substrate are equally distant from one another throughout their entire extent.

A conductive coating is applied to the one surface of the glass substrate having the bus bars thereon. The conductive coating extends between the pair of bus bars throughout their entire extent. When electrical energy is applied to the bus bars, a uniform flow of current takes place from one bus bar to another bus bar so that a uniformly developed heat pattern is established between the bus bars.

An alternate approach to the method of my invention is one in which the conductive coating is applied between the bus bars while the glass substrate is still in its flat configuration. Thereafter, the flat glass substrate with the bus bars and conductive coating on the one surface thereof is bent to form the glass vision unit of complex curved configuration.

The method of my invention may be applied to make electrically heated, glass vision units having one or two pieces of glass forming the vision unit. If only one piece of glass is used, only the single piece of glass is subjected to the bending operation. However, if two pieces of glass are used, one piece of glass will have the bus bars and conductive coating thereon while the other piece of glass will have no coating or bus bars thereon. The two pieces of glass, however, are bent simultaneously in a single bending operation as is well known in the art.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings wherein like reference characters indicate like parts throughout the several figures, and in which:

BEST MODE AND INDUSTRIAL APPLICABILITY

The following description is what I consider to be a preferred embodiment of the method of making an electrically heated, glass vision unit having a complex curved configuration in accordance with my invention. The following description also sets forth what I now contemplate to be the best mode of carrying out the method of my invention. The description is not intended to be a limitation upon the broader principles of the method of invention and while preferred materials are described to perform the method in accordance with the requirements of the laws, it does not mean that other materials cannot be used in the method of my invention.

Reference is now made to the drawings for a disclosure of the best mode of my invention.

Figure 1:
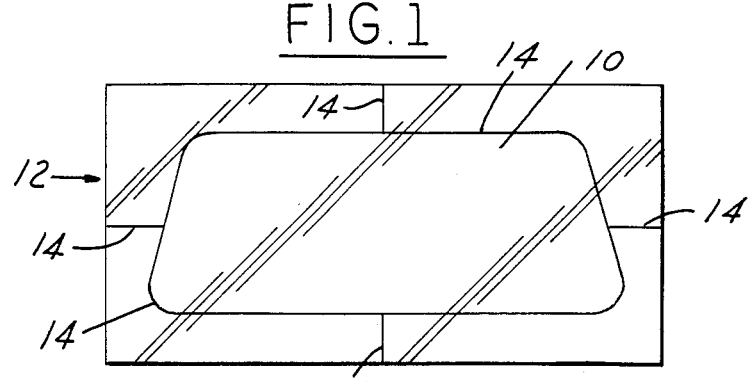
FIG. 1 is a schematic representation of a glass substrate being cut from a flat glass bracket.

In FIG. 1, there is seen a glass substrate 10 being cut from a flat glass bracket generally designated by the numeral 12. A plurality of score lines 14—14 define the shape of the glass substrate and vent lines which allow the glass substrate to be separated from the remaining glass of the glass bracket. Generally, the glass bracket is formed in a process in which the glass will have first and second surfaces separated by a uniform distance.

Figure 2:
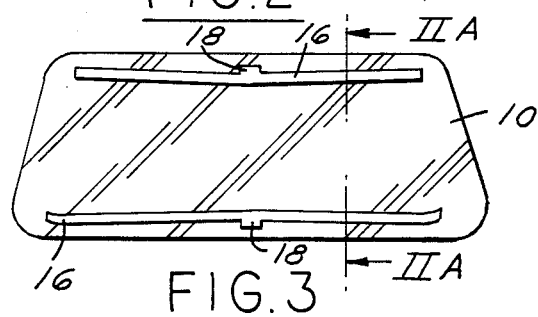
FIG. 2 is a schematic representation of a step in which a pair of electrically conductive bus bars are applied to one surface of the glass substrate.
Figure 2A:
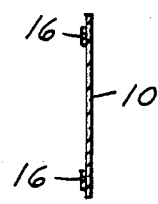
FIG. 2A is a cross section of the glass substrate taken along line IIA—IIA of FIG..2.

In FIG. 2, there is schematically illustrated the results of the second step of my method of making an electrically heated, glass vision unit having a complex curved configuration. In this second step, a pair of electrically conductive bus bars 16—16, which include terminal areas 18—18, are applied to one of the surfaces of the glass substrate 10. The bus bars and terminal areas are generally made from a silver ceramic material as is well known in the art. Generally, the silver ceramic in a suitable vehicle is silk screen printed on the selected surface of the glass and then heated so as to bond the silver ceramic material to the glass and drive off the vehicle.

The electrically heated vision unit of the preferred embodiment is a windshield for an automobile. Preferably, such a windshield will be made of a laminated construction in which two sheets of glass are used to form the windshield. The two sheets of glass are united by an inter layer of polyvinyl butyral in a manner well known to those skilled in the art. Therefore, there will be no further discussion of the lamination of a windshield in this specification.

The electrically conductive coating and bus bars for the electrically heated windshield construction of this invention, in its preferred embodiment, are applied to a surface of one of the glass sheets used to form the laminated windshield. In this case, the bus bars 16—16 and terminal areas 18—18 are on an interior surface of the one glass sheet of the laminated windshield (preferably closest to the exterior) and thus are protected from being abraded or otherwise contacted with physical articles which might scratch or destroy the same.

The construction which results after practice of the method of my invention, however, may be applied to a single sheet of glass (for example, a single sheet of tempered glass) if that construction is desired. If the single sheet of glass is used, the bus bars 16—16 and terminal areas 18—18 are normally applied to the surface of the glass sheet which is to face the interior of the vehicle. A suitable protective layer may be placed thereover, for example, a plastic sheet may be bonded to the construction when all of the elements are in place.

In accordance with the teachings of this invention, the bus bars 16—16 are placed on the glass substrate 10 so that when the glass substrate 10 is bent to form the glass vision unit of complex curved configuration, the pair of electrically conductive bus bars 16—16 are equally distant from one another throughout their entire extent. As illustrated in FIG. 2, when the bus bars 16—16 are applied, they may not be equally distant from one another. However, they will be equally distant from one another after the glass substrate 10 has been bent to its curved configuration.

One may determine how the bus bars 16—16 should be positioned on the glass substrate 10 in order to achieve the equally distant location in its bent form in several ways. For example, trial and error may be used in locating the bus bars and then measuring the position of the bus bars after the bending operation takes place. As an alternative to this, it is within the skill of an artisan to computer model the manner in which the glass substrate 10 will bend during the bending operation and therefore one may develop a computer model which would project the movement of the bus bars 16—16 during the bending operation. Once able to predict the movement of the bus bars, it is within the skill of an artisan to then be able to locate the bus bars 16—16 on the glass substrate 10 and while that substrate is in its flat condition accurately enough so that when the bending operation takes place the bus bars 16—16 will be equally distant from one another throughout their entire extent after the bending operation.

Figure 3:
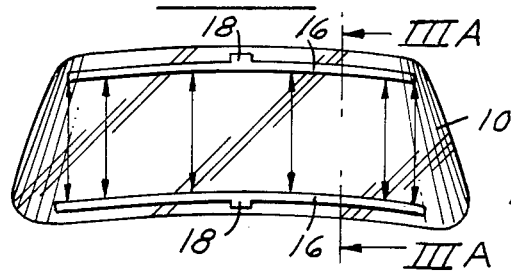
FIG. 3 is a schematic representation of the glass substrate bent to form a glass vision unit of complex concurved configuration.
Figure 3A:
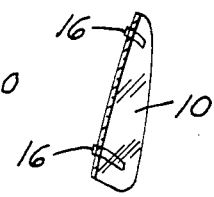
FIG. 3A is a view in cross section taken along line IIIA—IIIA of FIG. 3 showing the complex curved configuration to which the glass vision unit has been bent.

FIG. 3 is a schematic illustration of the glass substrate 10 after the bending operation has been carried out thereon. As is evident from the FIG. 3A showing a cross section of the glass substrate 10, the substrate has been bent into a glass vision unit having a complex curved configuration. If the vision unit is to be of laminated construction, two glass substrates would be bent together, the glass substrate 10 serving as the outer glass sheet and another glass substrate serving as the inner glass sheet for the laminated windshield.

As will be seen in FIG. 3, the bus bars 16—16 are now equally spaced from one another. By this, I mean that a line emanating perpendicular from one bus bar to the other is of the same length throughout the entire length and extent of the bus bars 16—16. The desirability of having this equally distant spacing will be explained in greater detail hereinbelow.

Figure 4:
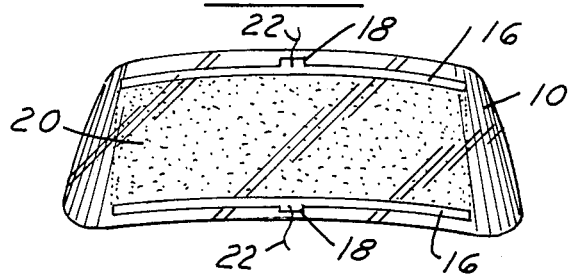
FIG. 4 is a schematic representation of the application of a conductive coating to the glass substrate extending between the pair of bus bars placed on the glass substrate and also showing electrical leads attached thereto so that electrical energy may be supplied to the conductive coating.

FIG. 4 illustrates schematically the application of a conductive coating 20 to the glass substrate 10 between the bus bars 16—16. The electrically conductive coating is preferably applied by a magnetron sputtering operation. Magnetron sputtering of glass surfaces is well known in the art. In accordance with the teachings of a preferred embodiment of the invention, the materials used as target materials in the magnetron sputtering device are zinc and silver. The resulting coating which is applied to the windshield is a multilayer coating consisting of zinc oxide and silver which form a coating which is electrically conductive. By electrically conductive, I mean that electric current either AC or DC can be passed across the silver containing coating. Electrical leads 22—22 are bonded to the terminal areas 18—18 so that the electrical energy may be applied to the conductive coating 20.

In order to finish the vision unit, it may be laminated with another glass sheet bent therewith so as to make a laminated windshield. As an alternative, the single sheet of glass may be used as, for example, as a tempered windshield. In this case, one might desire to apply a protective layer of plastic over the conductive material and bus bars so that they are not damaged by contact therewith of sharp or blunt objects.

In accordance with the teachings of this invention, because the electrodes or bus bars 16—16 are equally distant from one another throughout their entire extent, when the glass substrate 10 is bent to its complex curved configuration, a uniform flow of current takes place from one bus bar to another bus bar. By having a uniform flow of current between the equally distant bus bars, a uniformly developed heat pattern is established between the bus bars. By establishment of such a uniform heat pattern, the windshield is uniformly defrosted or defogged when activated.

As an alternate to the method of our invention, the steps of applying a conductive coating 20 to the one surface of the glass substrate 10 extending between the pair of bus bar 16—16 may occur prior to the bending of the glass substrate to its complex curved configuration. The only major requirement is that when the glass has been bent into the desired final shape, the pair of bus bars 16—16 are equally distant from one another throughout their entire extent.

While particular embodiments of the invention have been illustrated and described, it will be obvious to those skilled in the art that various changes and modifications may be made without departing from the invention. It is intended to cover in the appended claims all such modifications and equivalents as fall within the true spirit and scope of this invention.

I claim:

1. A method of making an electrically heated, glass vision unit having a complex curved configuration, which method comprises the steps of;
   cutting a glass substrate from a flat glass bracket, said glass substrate having first and second surfaces separated by a uniform distance;
   applying a pair of electrically conductive bus bars to one of said surfaces of said glass substrate, said bus bars being so positioned on said flat glass substrate that when said substrate is bent to form the glass vision unit of complex curved configuration, said pair of electrically conductive bus bars are equally distant from one another throughout their entire extent;
   bending said flat glass substrate to form the glass vision unit of complex curved configuration whereby said pair of bus bars are equally distant from one another throughout their extent;
   applying a conductive coating to said one surface of said glass substrate extending between said pair of bus bars throughout their entire extent, whereby when electrical energy is applied to said bus bars, a uniform flow of current takes place from one bus bar to another bus bar so that a uniformly developed heat pattern is established between said bus bars.

2. The method of claim 1 wherein a second glass substrate is simultaneously bent with said flat glass substrate to form a pair of glass substrates, and
   subseguently laminating said pair of glass substrates together to form a laminated, electrically heated glass vision unit having a complex curved configuration.

3. A method of making an electrically heated, glass vision unit having a complex curved configuration which method comprises the steps of:
   cutting a glass substrate from a flat glass bracket, said glass substrate having first and second surfaces separated by a uniform distance;
   applying a pair of electrically conductive bus bars to one of said surfaces of said glass substrate, said bus bars being so positioned on said flat glass substrate that when said substrate is bent to form the glass vision unit of complex curved configuration, said pair of electrically conductive bus bars are equally distant from one another throughout their entire extent;
   applying a conductive coating to said one surface of said glass substrate extending between said pair of bus bars throughout their entire extent; and
   bending said flat glass substrate to form the glass vision unit of complex curved configuration whereby said pair of bus bars are equally distant from one another throughout their entire extent and whereby electrical energy is applied to said bus bars, a uniform flow of current takes place from one bus bar to another bus bar so that a uniformly developed heat pattern is established between said bus bars.

4. The method of claim 3 wherein a second glass substrate is simultaneously bent with said flat glass substrate to form a pair of glass substrates, and
   subsequently laminating said pair of glass substrates together to form a laminated, electrically heated glass vision unit having a complex curved configuration.

* * * * *